US012444849B2

(12) United States Patent
Wu et al.

(10) Patent No.: US 12,444,849 B2
(45) Date of Patent: Oct. 14, 2025

(54) ANTENNA MODULE

(71) Applicant: PEGATRON CORPORATION, Taipei (TW)

(72) Inventors: Chien-Yi Wu, Taipei (TW); Shao-Chi Wang, Taipei (TW); Hau Yuen Tan, Taipei (TW); Hung-Te Liao, Taipei (TW); Chao-Hsu Wu, Taipei (TW); Chih-Hung Cho, Taipei (TW); Tse-Hsuan Wang, Taipei (TW); I-Shu Lee, Taipei (TW); Jr-Wei Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 57 days.

(21) Appl. No.: 18/652,976

(22) Filed: May 2, 2024

(65) Prior Publication Data

US 2025/0096476 A1 Mar. 20, 2025

(30) Foreign Application Priority Data

Sep. 15, 2023 (TW) ................................ 112135280

(51) Int. Cl.
*H01Q 5/30* (2015.01)
*H01Q 1/48* (2006.01)
*H01Q 5/10* (2015.01)
*H01Q 13/16* (2006.01)

(52) U.S. Cl.
CPC ............... *H01Q 13/16* (2013.01); *H01Q 1/48* (2013.01); *H01Q 5/10* (2015.01)

(58) Field of Classification Search
CPC ............ H01Q 1/22; H01Q 1/243; H01Q 1/38; H01Q 1/48; H01Q 1/52; H01Q 5/30–40; H01Q 9/42; H01Q 13/10; H01Q 13/16
See application file for complete search history.

(56) References Cited

U.S. PATENT DOCUMENTS

| | | | | |
|---|---|---|---|---|
| 7,535,422 | B2 * | 5/2009 | Liu .......................... | H01Q 9/42 343/702 |
| 10,090,581 | B2 * | 10/2018 | Wu ........................ | H01Q 21/28 |
| 11,527,811 | B2 * | 12/2022 | Nishikawa ............... | H01Q 9/42 |
| 2011/0050528 | A1 | 3/2011 | Montgomery | |

FOREIGN PATENT DOCUMENTS

| | | |
|---|---|---|
| CN | 108461921 | 8/2018 |
| CN | 111864350 | 10/2020 |
| TW | I737354 | 8/2021 |
| TW | I765621 | 5/2022 |

* cited by examiner

*Primary Examiner* — Hasan Islam
(74) *Attorney, Agent, or Firm* — J.C. PATENTS

(57) ABSTRACT

An antenna module includes a ground radiator, a first antenna, and a second antenna. The first antenna includes a first feeding end, a first segment, a second segment, a third segment, and a fourth segment. A first area of the first antenna and a second area including a part of the first antenna and a part of the ground radiator resonate at a first frequency band. A third area of the first antenna and the second area resonate at a second frequency band. An area including a part of the second antenna, the third segment, the first segment, and the second segment resonates at the first frequency band. An area of the second antenna and an area including the part of the second antenna, a part of the third segment, and another part of the ground radiator resonate at the second frequency band.

10 Claims, 10 Drawing Sheets

ANTENNA MODULE

CROSS-REFERENCE TO RELATED APPLICATION

This application claims the priority benefit of Taiwan application serial no. 112135280, filed on Sep. 15, 2023. The entirety of the above-mentioned patent application is hereby incorporated by reference herein and made a part of this specification.

BACKGROUND

Technical Field

The disclosure relates to an antenna module, and particularly relates to an antenna module that is small in size and has broadband and good antenna performance.

Description of Related Art

As multiple input multiple output (MIMO) technology becomes increasingly popular in antenna design, how to add more antennas to the effective space while ensuring the performance of the antennas is the direction that the field intends to explore and resolve.

SUMMARY

The disclosure provides an antenna module, which has the characteristics of small size, broadband, and good antenna performance.

An antenna module of the disclosure includes a ground radiator, a first antenna, and a second antenna. The ground radiator includes a first part and a second part connected to each other. The first antenna includes a first feeding end, a first segment extending from the first feeding end, a second segment, a third segment, and a fourth segment, wherein the second segment, the third segment, and the fourth segment extend from the first segment. The third segment is connected to the ground radiator. A first area including the first feeding end, the first segment, and the second segment and a second area including the first feeding end, the first segment, the third segment, and a first part of the ground radiator resonate at a first frequency band. A third area including the first feeding end, the first segment, and the fourth segment and the second area resonate at a second frequency band. The second antenna includes a second feeding end and a fifth segment and a sixth segment, wherein the fifth segment and the sixth segment extend from the second feeding end. The fifth segment is connected to the third segment. A fourth area including the second feeding end, the fifth segment, the third segment, the first segment, and the second segment resonates at the first frequency band. A fifth area including the second feeding end and the sixth segment and a sixth area including the second feeding end, the fifth segment, a part of the third segment, and a second part of the ground radiator resonate at the second frequency band.

In an embodiment of the disclosure, a distance between the first feeding end and the second feeding end is 0.25 times to 0.5 times a wavelength of the first frequency band.

In an embodiment of the disclosure, the fifth segment extends back and forth along a first axis to form a first winding path.

In an embodiment of the disclosure, a part of the fifth segment extends back and forth along the first axis to form the first winding path, and another part of the fifth segment extends back and forth along a second axis to form a second winding path.

In an embodiment of the disclosure, the first segment and the third segment are located next to the first part of the ground radiator, and a first slot is formed between the first segment and the first part and between the third segment and the first part.

In an embodiment of the disclosure, the fifth segment and the sixth segment are located next to the second segment, and a second slot is formed between the fifth segment and the second segment and between the sixth segment and the second segment.

In an embodiment of the disclosure, the fifth segment and the sixth segment are located next to the second part of the ground radiator, and a third slot is formed between the fifth segment and the second part and between the sixth segment and the second part.

In an embodiment of the disclosure, the antenna module further includes a first conductive member and a second conductive member. The first conductive member is connected to the first part of the ground radiator. The second conductive member is connected to the second part of the ground radiator. A fourth slot is formed between the first conductive member and the second conductive member.

In an embodiment of the disclosure, the ground radiator further includes a fifth slot. The fifth slot is concave and includes a first gap and a second gap. The first gap and the second gap are bent and connected to form an L shape. The first gap is recessed in an edge of the second part of the ground radiator and located next to the fifth segment. The second gap is located inside the first part of the ground radiator.

In an embodiment of the disclosure, the fifth segment and the third segment cooperate with a portion of the first part of the ground radiator located between the second gap and the third segment to form a first-order inductance. The fifth slot forms a first-order capacitance. A portion of the ground radiator located between the fourth slot and the fifth slot forms a second-order inductance. The fourth slot forms a second-order capacitance.

Based on the above, the antenna module of the disclosure includes the ground radiator, the first antenna, and the second antenna. The first antenna includes the first feeding end, the first segment, the second segment, the third segment, and the fourth segment. The first area including the first feeding end, the first segment, and the second segment and the second area including the first feeding end, the first segment, the third segment, and the first part of the ground radiator resonate at the first frequency band. The third area including the first feeding end, the first segment, and the fourth segment and the second area resonate at the second frequency band. The second antenna includes the second feeding end, the fifth segment, and the sixth segment. The fourth area including the second feeding end, the fifth segment, the third segment, the first segment, and the second segment resonates at the first frequency band. The fifth area including the second feeding end and the sixth segment and the sixth area including the second feeding end, the fifth segment, a part of the third segment, and the second part of the ground radiator resonate at the second frequency band. The antenna module uses the second antenna to share the radiators of the first segment, the second segment, and the third segment of the first antenna, so that the antenna module has the characteristics of small size, broadband, and good performance.

DESCRIPTION OF THE EMBODIMENTS

Figure 1:
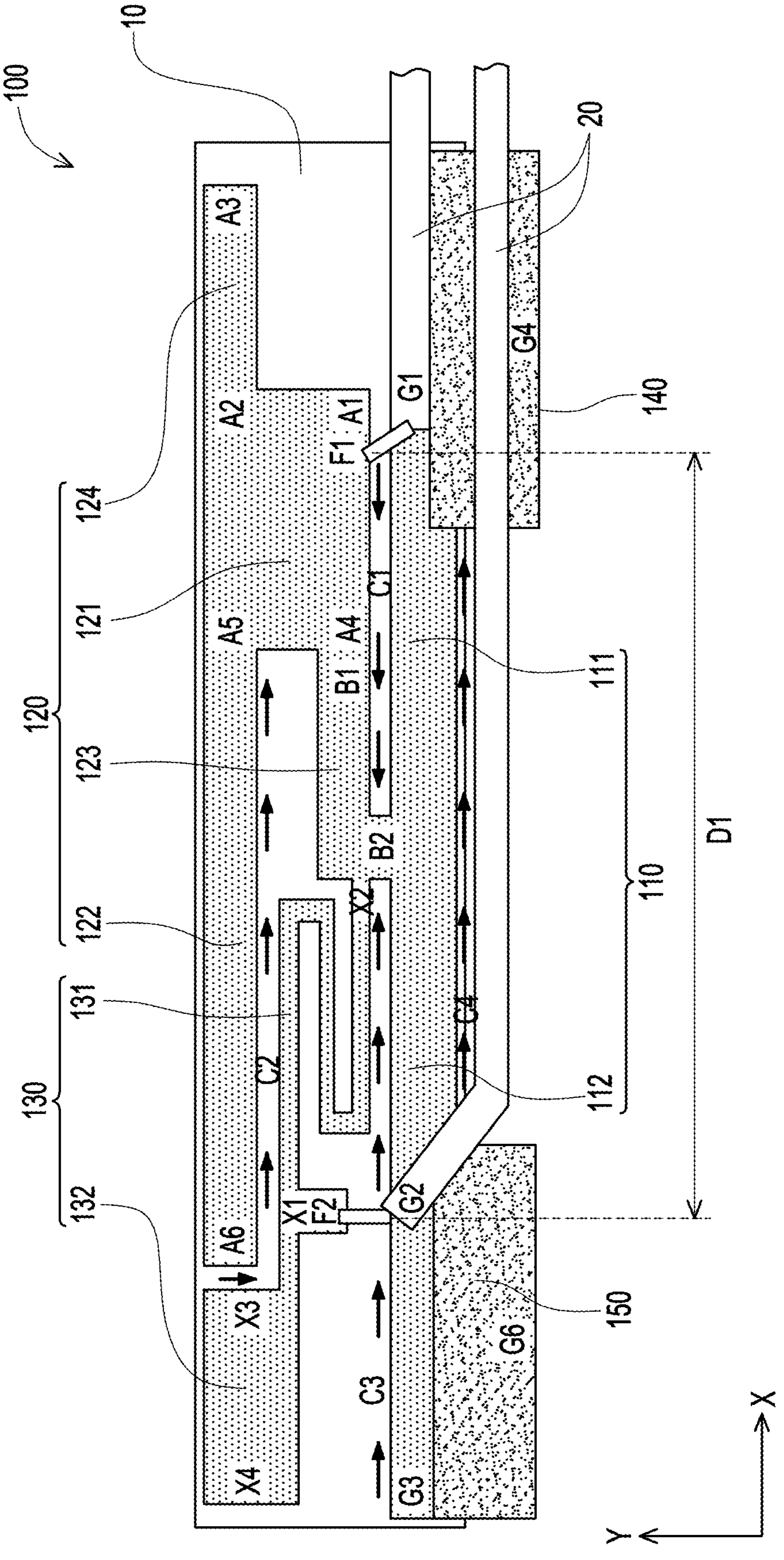
FIG. 1 is a schematic view of an antenna module according to an embodiment of the disclosure.

FIG. 1 is a schematic view of an antenna module according to an embodiment of the disclosure. Referring to FIG. 1, an antenna module 100 of the disclosure is, for example, a dual-feed asymmetric planar inverted f-shaped antenna (PIFA). The antenna module 100 is disposed on a circuit board 10 with dimensions of 32 mm×6.2 mm×0.4 mm. In the embodiment, the material of the circuit board 10 is FR-4, but the material of the circuit board 10 is not limited thereto. The antenna module 100 includes a ground radiator 110 (an area from a position G3 to positions G2, B2, G1, and G5 in sequence (FIG. 2B)), a first antenna 120 and a second antenna 130.

The ground radiator 110 includes a first part 111 (the part from the position B2 to the positions G1 and G5 in sequence (FIG. 2B)) and a second part 112 (the part from the position B2 to the positions G2 and G3 in sequence) connected to each other.

The first antenna 120 includes a first feeding end F1 that feeds directly, a first segment 121 extending from the first feeding end F1 (a path from a position A1 to positions A2, A5, and A4 in sequence), a second segment 122 (a path from the position A5 to a position A6), a third segment 123 (a path from the position A4 to positions B1 and B2 in sequence), and a fourth segment 124 (a path from the position A2 to a position A3). The second segment 122, the third segment 123, and the fourth segment 124 extend from the first segment 121. The third segment 123 is connected to the ground radiator 110 through the position B2.

The second antenna 130 includes a second feeding end F2 that feeds directly, a fifth segment 131 (a path from a position X1 to a position X2) and a sixth segment 132 (a path from a position X3 to a position X4). The fifth segment 131 and the sixth segment 132 extend from the second feeding end F2. The fifth segment 131 is connected to the third segment 123 through the position X2, and the fifth segment 131 extends back and forth along a first axis X to form a first winding path.

Continuing to refer to FIG. 1, the first segment 121 and the third segment 123 are located next to the first part 111 of the ground radiator 110, and a first slot C1 is formed between the first segment 121 and the first part 111 and between the third segment 123 and the first part 111.

The fifth segment 131 and the sixth segment 132 are located next to the second segment 122, and a second slot C2 is formed between the fifth segment 131 and the second segment 122 and between the sixth segment 132 and the second segment 122.

The fifth segment 131 and the sixth segment 132 are located next to the second part 112 of the ground radiator 110, and a third slot C3 is formed between the fifth segment 131 and the second part 112 and between the sixth segment 132 and the second part 112.

In addition, the antenna module 100 further includes a first conductive member 140 and a second conductive member 150. The first conductive member 140 is connected to the first part 111 of the ground radiator 110, and the second conductive member 150 is connected to the second part 112 of the radiator 110, a fourth slot C4 is formed between the first conductive member 140 and the second conductive member 150. In the embodiment, the first conductive member 140 and the second conductive member 150 are, for example, copper foil, but the types of the first conductive member 140 and the second conductive member 150 are not limited thereto.

It should be noted that the antenna module 100 is connected to a negative end of the coaxial transmission line 20 through the ground positions G1 and G2, so that the coaxial transmission line 20 is electrically connected to a ground position G4 of the first conductive member 140 and a ground position G6 of the second conductive member 150, respectively, and then electrically connected to a system ground plane (not shown). In addition, the antenna module 100 is also electrically connected to positive ends of two coaxial transmission lines 20 through the first feeding end F1 and the second feeding end F2 respectively, so as to feed the signal to the first antenna 120 and the second antenna 130.

Figure 2A:
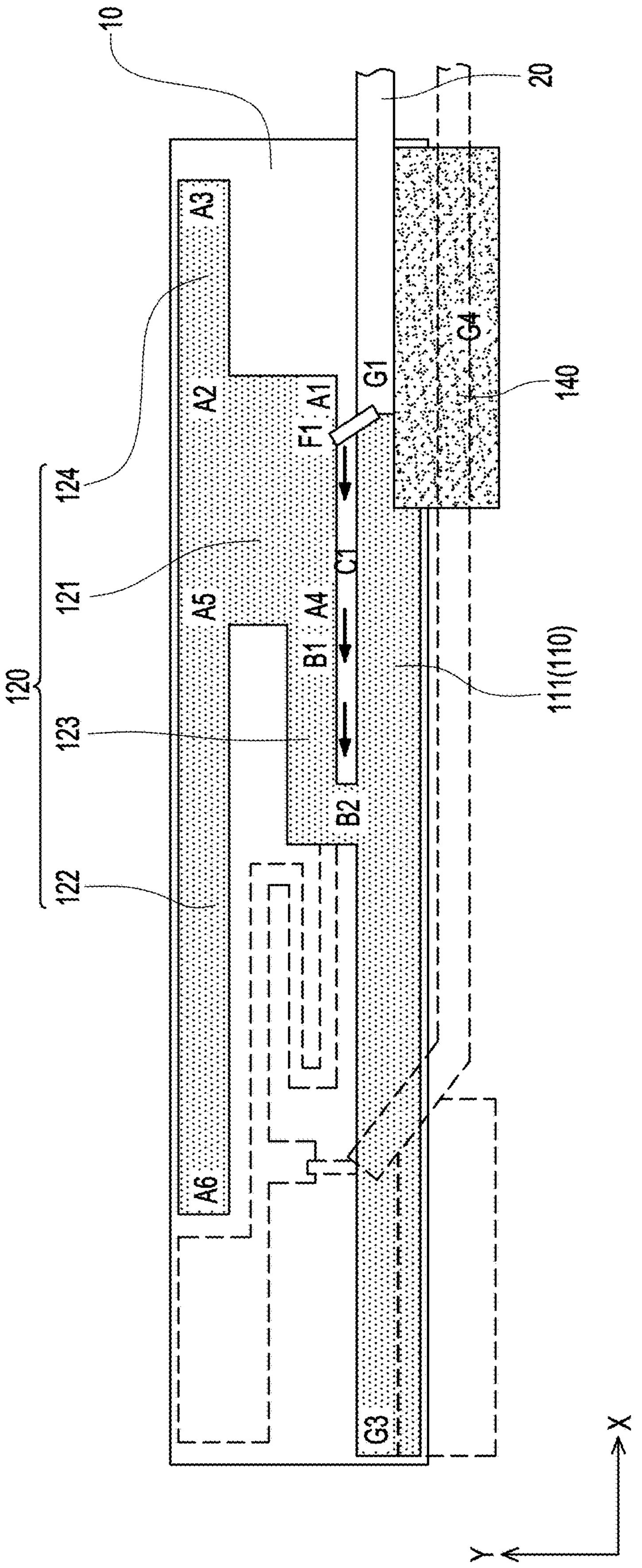
FIG. 2A is a schematic view of a resonance area of the first antenna of FIG. 1 during operation.

FIG. 2A is a schematic view of a resonance area of the first antenna of FIG. 1 during operation. It should be noted that, in order to clearly illustrate the resonance area when the first antenna 120 is operating, the areas and components that do not participate in the resonance are shown with dotted lines.

Referring to FIG. 2A, the first feeding end F1 of the first antenna 120 is connected to an area from the position A1 to the positions A2 and A3 in sequence and an area from the position A4 to the positions A5 and A6 in sequence, electrically connected to the third segment 123 through the position A4 and electrically connected to the ground radiator 110 through the position B2, and further electrically connected to the ground position G4 of the first conductive member 140 and the system ground plane. Such a design enables the first antenna 120 to have the architecture of a PIFA antenna, and the first antenna 120 can resonate through different areas to generate signals in different frequency bands. The signals in different frequency bands generated by different resonance areas will be described in detail below.

The first antenna 120 resonates at a first frequency band through a first area including the first feeding end F1, the first segment 121, and the second segment 122 (i.e., an area from the first feeding end F1 to the positions A1, A2, A5, and A6 in sequence) and a second area including the first feeding end F1, the first segment 121, the third segment 123, and the first part 111 of the ground radiator 110 (i.e., an area from the first feeding end F1 to the positions A1, A4, B1, B2, and G1 in sequence). On the other hand, the first antenna 120 resonates at a second frequency band through a third area including the first feeding end F1, the first segment 121, and the fourth segment 124 (i.e., an area from the first feeding end F1 to positions A1, A2, and A3 in sequence) and the above-mentioned second area.

In the embodiment, the first frequency band is from 2400 MHz to 2484 MHz, and the second frequency band is from 5150 MHz to 7124 MHz. In addition, the first frequency band generated by the antenna module 100 can be used for WiFi 2.4G, and the second frequency band can be used for WiFi 5G and WiFi 6E such that the antenna module 100 has the application bandwidth of WiFi 7.

It is worth mentioning that the first antenna 120 can control the frequency point and impedance matching bandwidth of the first frequency band by adjusting the length and width of the second segment 122. In addition, the first antenna 120 can also control the frequency point and impedance matching bandwidth of the second frequency band by adjusting the length and width of the fourth segment 124, the area from the first feeding end F1 to positions A4, B1, B2, and G1 in sequence, and the length and width of the first slot C1.

Figure 2B:
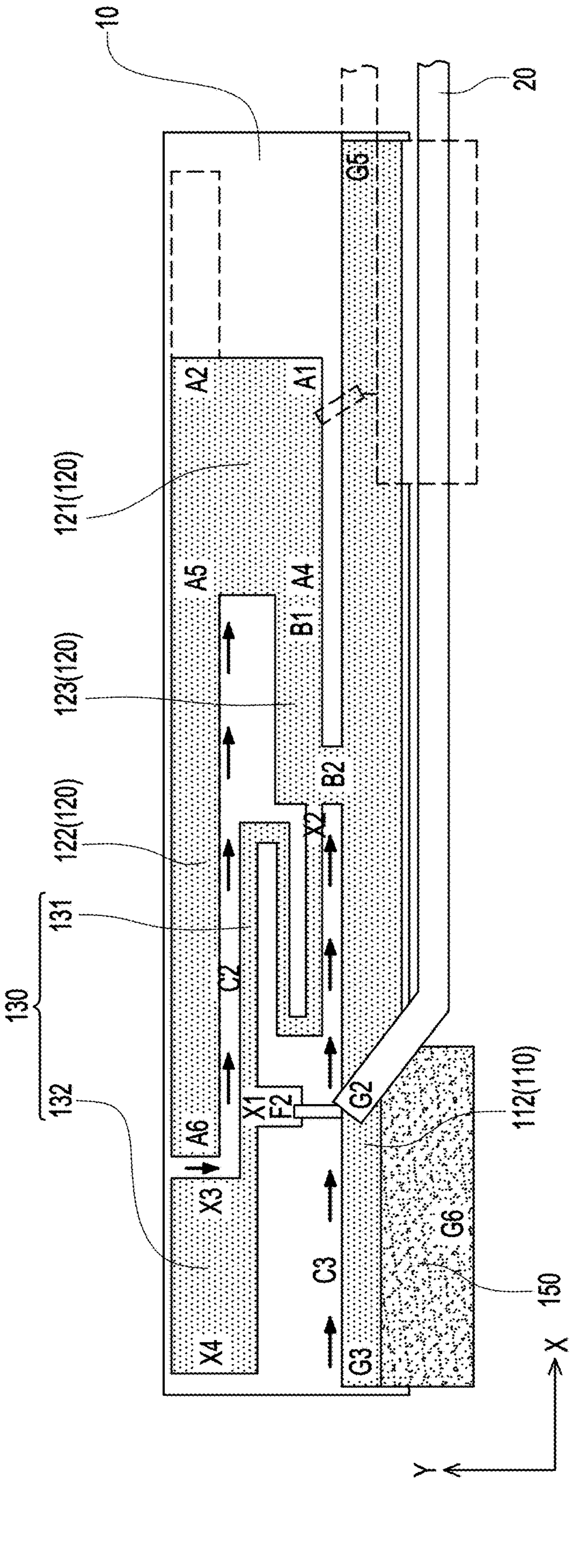
FIG. 2B is a schematic view of a resonance area of the second antenna of FIG. 1 during operation.

FIG. 2B is a schematic view of a resonance area of the second antenna of FIG. 1 during operation. It should be noted that, in order to clearly illustrate the resonance area when the second antenna 130 is operating, the areas and components that do not participate in the resonance are shown with dotted lines.

Referring to FIG. 2B, the second feeding end F2 of the second antenna 130 is connected to the area from the position X1 to the position X2 and an area from the position X1 to the positions X3 and X4 in sequence, electrically connected to the third segment 123, the first segment 121, the second segment 122, and the ground radiator 110 of the first antenna 120 through the position X2, and further electrically connected to the ground position G6 of the second conductive member 150 and the system ground plane. Such a design enables the second antenna 130 to also have the architecture of a PIFA antenna, and the second antenna 130 can also resonate through different areas to generate signals in different frequency bands. The signals in different frequency bands generated by different resonance areas will be described in detail below.

The second antenna 130 resonates at the above-mentioned first frequency band through a fourth area including the second feeding end F2, the fifth segment 131, the third segment 123, the first segment 121, and the second segment 122 (i.e., an area from the second feeding end F2 to the positions X1, X2, B2, B1, A4, A1, A2, A5, and A6 in sequence). On the other hand, the second antenna 130 resonates at the above-mentioned second frequency band through a fifth area including the second feeding end F2 and the sixth segment 132 (i.e., an area from the second feeding end F2 to the positions X1, X3, and X4 in sequence) and a sixth area including the second feeding end F2, the fifth segment 131, a part of the third segment 123, and the second part 112 of the ground radiator 110 (i.e., an area from the second feeding end F2 to the positions X1, X2, B2, G2, and G3).

It is worth mentioning that the second antenna 130 can adjust the length and width of the second slot C2 to control the frequency point and impedance matching bandwidth of the first frequency band by adjusting an area from the position X3 to the positions X1, X2, B2, B1, A4, A5, and A6 in sequence. In addition, the second antenna 130 can also control the frequency point and impedance matching bandwidth of the second frequency band by adjusting the length and width of the sixth segment 132, an area from the position X4 to the positions X3, X1, X2, B2, G2, G3 in sequence, and the length and width of the third slot C3.

It is also worth mentioning that when resonating at the first frequency band, the second antenna 130 will share the third segment 123, the first segment 121, and the second segment 122 of the first antenna 120. Such a design enables the antenna module 100 to have a smaller size and at the same time have the multi-band characteristics of WiFi 7 covering 2.4G, 5G, and 6E, and can further be applied to 5G NR MIMO antennas.

In addition, it should be noted that a distance D1 (FIG. 1) between the first feeding end F1 and the second feeding end F2 of the antenna module 100 is 0.25 times to 0.5 times the wavelength of the above-mentioned first frequency band, so that the antenna module 100 can have a flexible layout in a limited space, and at the same time have good antenna performance. In the embodiment, the distance D1 between the first feeding end F1 and the second feeding end F2 is 17.5 mm.

Figure 3:
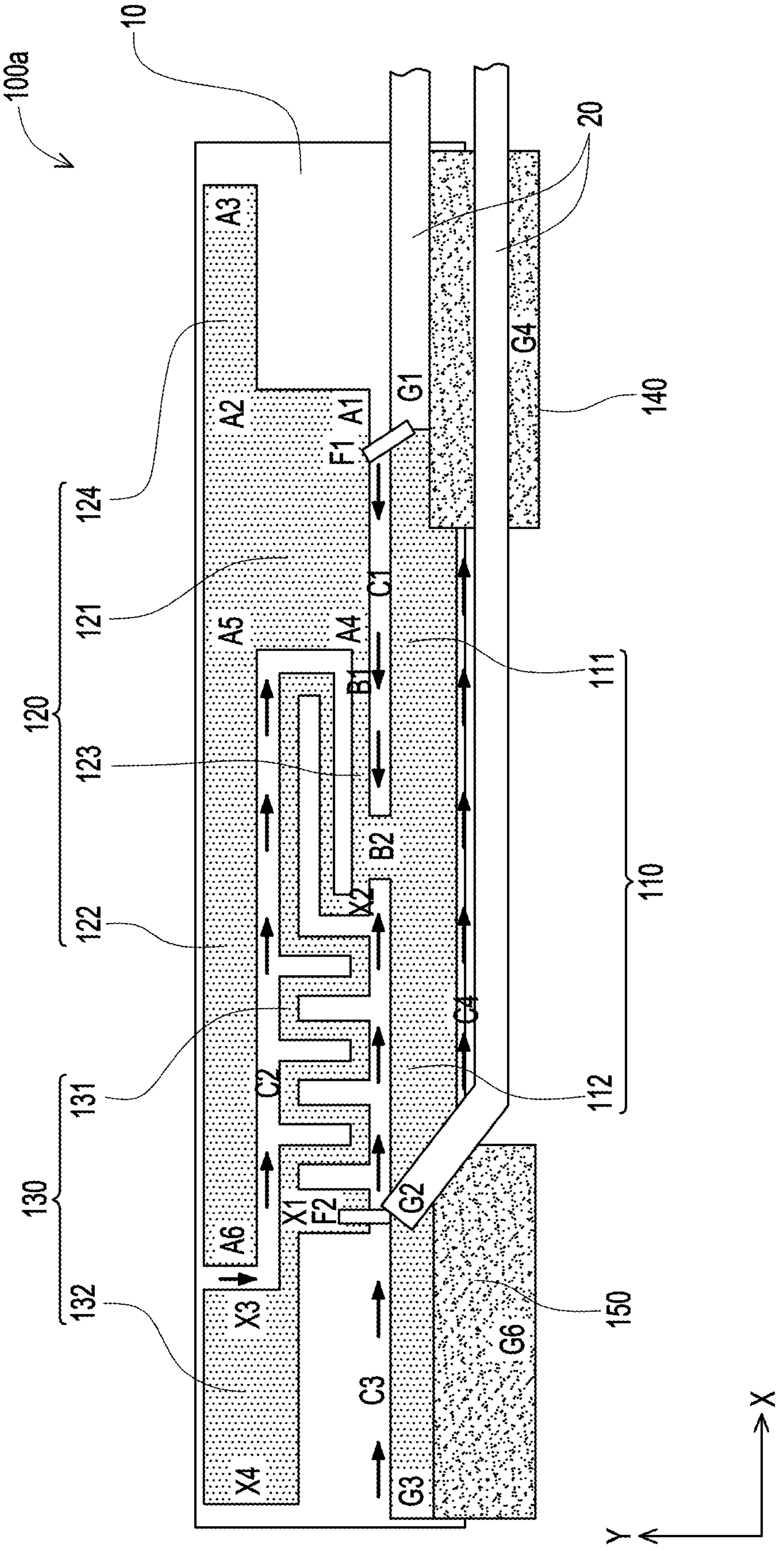
FIG. 3 is a schematic view of an antenna module according to another embodiment of the disclosure.

FIG. 3 is a schematic view of an antenna module according to another embodiment of the disclosure. It should be noted that the difference between an antenna module 100*a* of FIG. 3 and the antenna module 100 of FIG. 1 lies in the path shape and length of the fifth segment 131. The differences will be explained below.

Referring to FIG. 3, a part of the fifth segment 131 extends back and forth along the first axis X to form a first winding path, and another part of the fifth segment 131 extends back and forth along a second axis Y perpendicular to the first axis X to form a second winding path. In the embodiment, the second winding path is connected to the second feeding end F2, and the first winding path is disposed between the second winding path and the third segment 123. Such a design allows the antenna module 100*a* to have different impedance matching and antenna performance from the antenna module 100.

Figure 4:
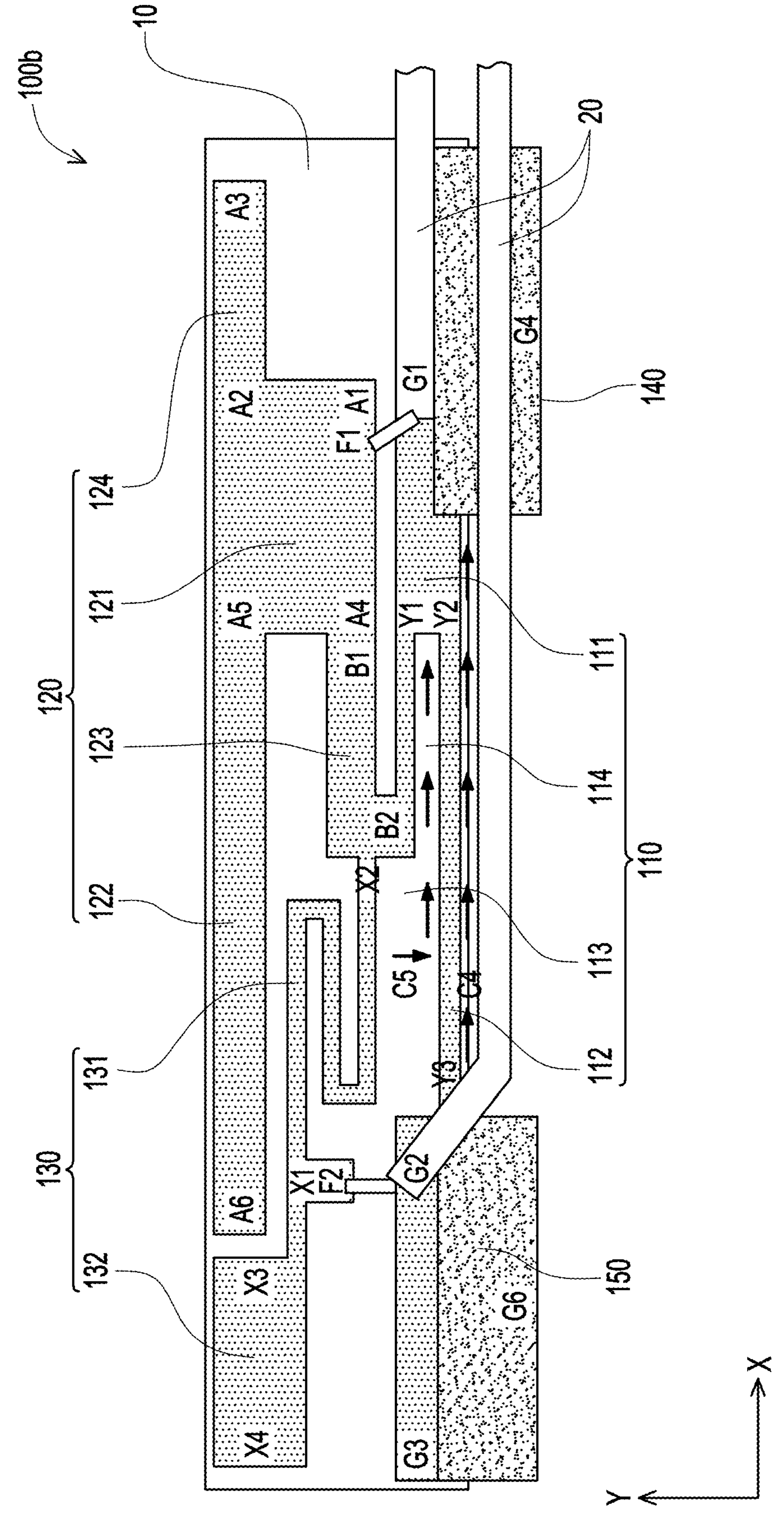
FIG. 4 is a schematic view of an antenna module according to still another embodiment of the disclosure.
Figure 5:
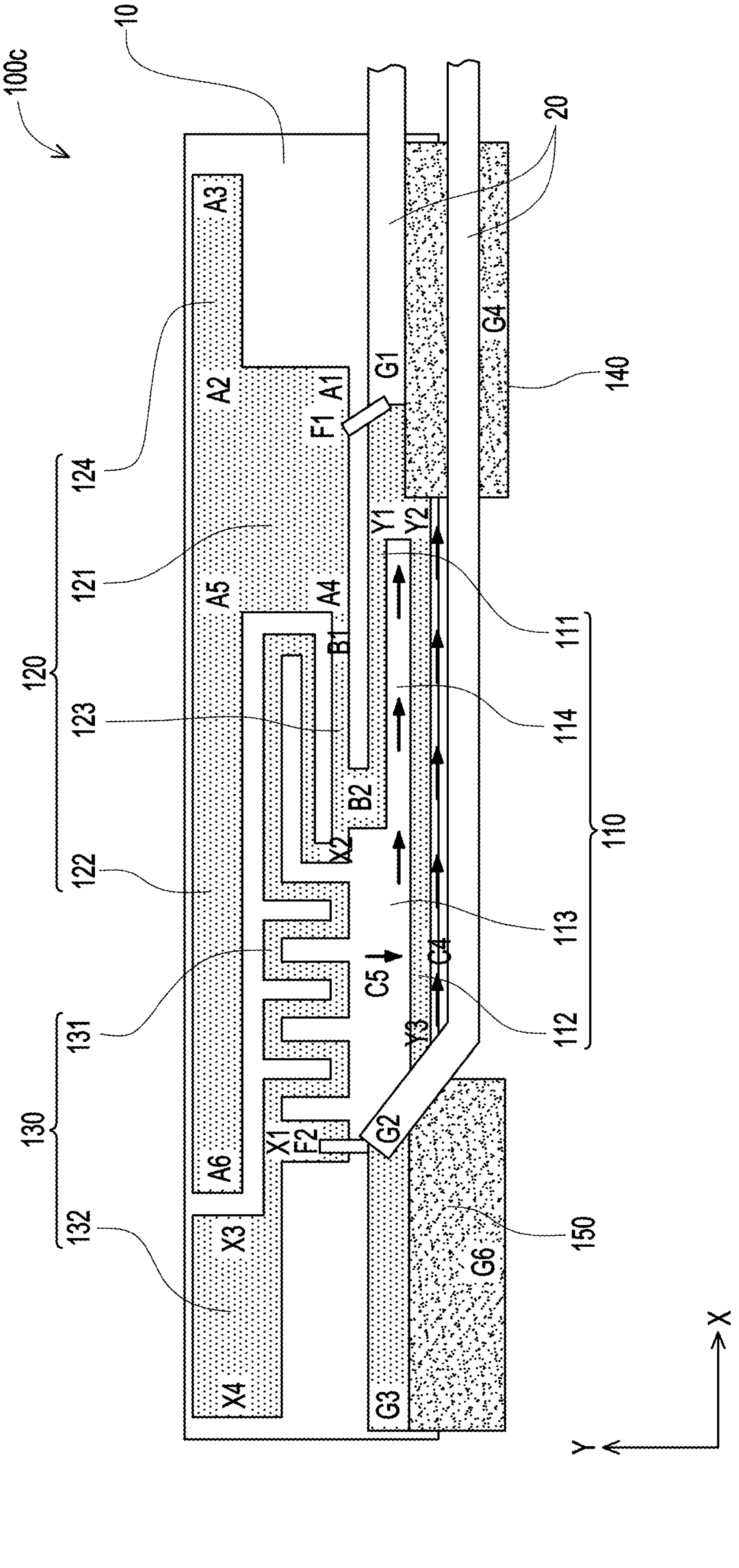
FIG. 5 is a schematic view of an antenna module according to yet another embodiment of the disclosure.

FIG. 4 is a schematic view of an antenna module according to still another embodiment of the disclosure. FIG. 5 is a schematic view of an antenna module according to yet another embodiment of the disclosure. It should be noted that the difference between an antenna module 100*b* of FIG. 4 and the antenna module 100 of FIG. 1 and the difference between an antenna module 100*c* of FIG. 5 and the antenna module 100*a* of FIG. 3 are that the antenna module 100*b* and the antenna module 100*c* include a fifth slot C5. The structure and function of the fifth slot C5 will be described below.

Referring to FIG. 4 and FIG. 5, the ground radiator 110 further includes the fifth slot C5, and the fifth slot C5 is concave and includes a first gap 113 and a second gap 114. The first gap 113 and the second gap 114 are bent and connected to form an L shape. The first gap 113 is recessed in an edge of the second part 112 of the ground radiator 110 and located next to the fifth segment 131. The second gap 114 is located inside the first part 111 of the ground radiator 110. The antenna module 100 can have two second-order LC filter circuits coupled in series between the first antenna 120 and the second antenna 130 through the arrangement of the fifth slot C5.

In detail, the second-order LC filter circuit consists of the following areas. The fifth segment 131 and the third segment 123 cooperate with a portion of the first part 111 of the ground radiator 110 located between the second gap 114 and the third segment 123, that is, an area from the position X1 to the positions X2, B2, and Y1 in sequence, to form a first-order inductance. The fifth slot C5 forms a first-order capacitance. A portion of the ground radiator 110 located between the fourth slot C4 and the fifth slot C5, that is, an area from a position Y3 to a position Y2, forms a second-order inductance. The fourth slot C4 forms a second-order capacitance.

Such a design can improve the impedance matching of the first antenna 120 in the first frequency band and simultaneously improve the isolation between the first antenna 120 and the second antenna 130 in the first frequency band. Therefore, when the second-order LC filter circuit is disposed in the antenna modules 100*b* and 100*c*, the antenna modules 100*b* and 100*c* generate the first frequency band and the second frequency band through the first antenna 120, and generate the second frequency band through the second antenna 130.

Figure 6:
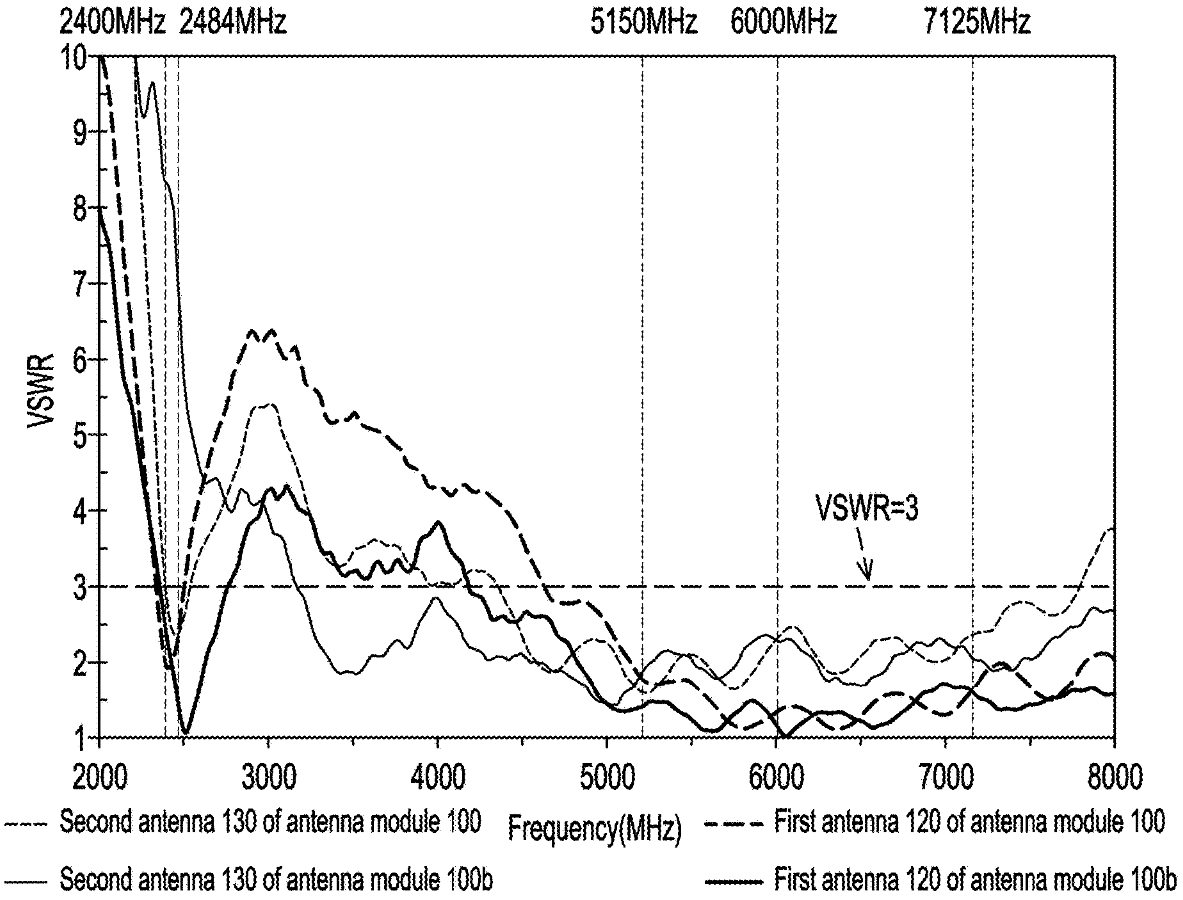
FIG. 6 is a frequency-VSWR relation view of the antenna module of FIG. 1 and the antenna module of FIG. 4.

FIG. 6 is a frequency-VSWR relation view of the antenna module of FIG. 1 and the antenna module of FIG. 4. It should be noted that when the second-order LC filter circuit is disposed in the antenna module 100*b*, the second antenna 130 of the antenna module 100*b* tends to be ineffective in the low frequency band. Referring to FIG. 6, in the embodiment, the VSWR of the antenna module 100 and the antenna module 100*b* at frequencies 2400 to 2484 MHz and 5150 to 7125 MHz is less than 3, and has good broadband performance.

Figure 7:
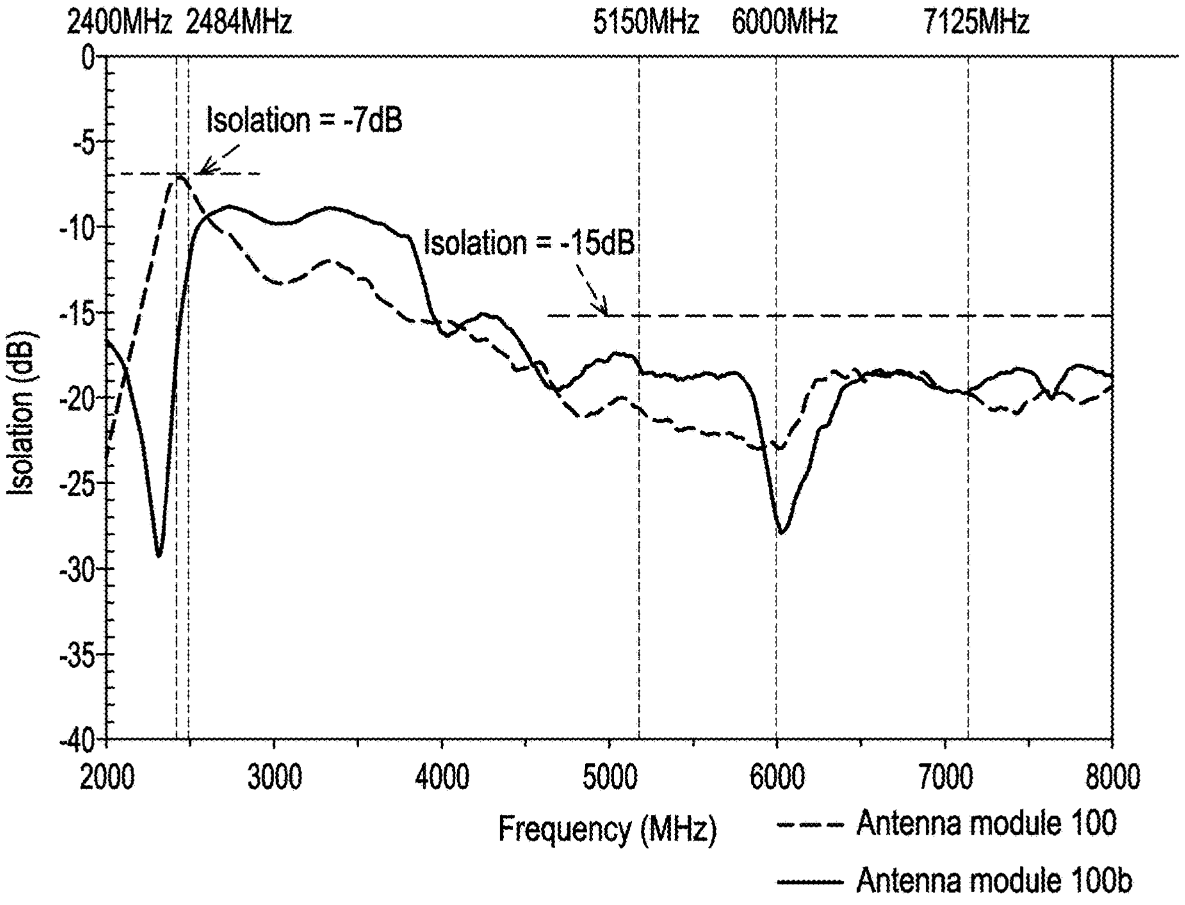
FIG. 7 is a frequency-isolation relation view of the antenna module of FIG. 1 and the antenna module of FIG. 4.

FIG. 7 is a frequency-isolation relation view of the antenna module of FIG. 1 and the antenna module of FIG. 4. Referring to FIG. 7, in the embodiment, the isolation of the antenna module 100*b* at the frequency of 2400 to 2484 MHz is less than-12 dB and the isolation at the frequency of 5150 to 7125 MHz is less than-18 dB. That is to say, the antenna module 100*b* has good isolation performance through the arrangement of the second-order LC filter circuit.

Figure 8:
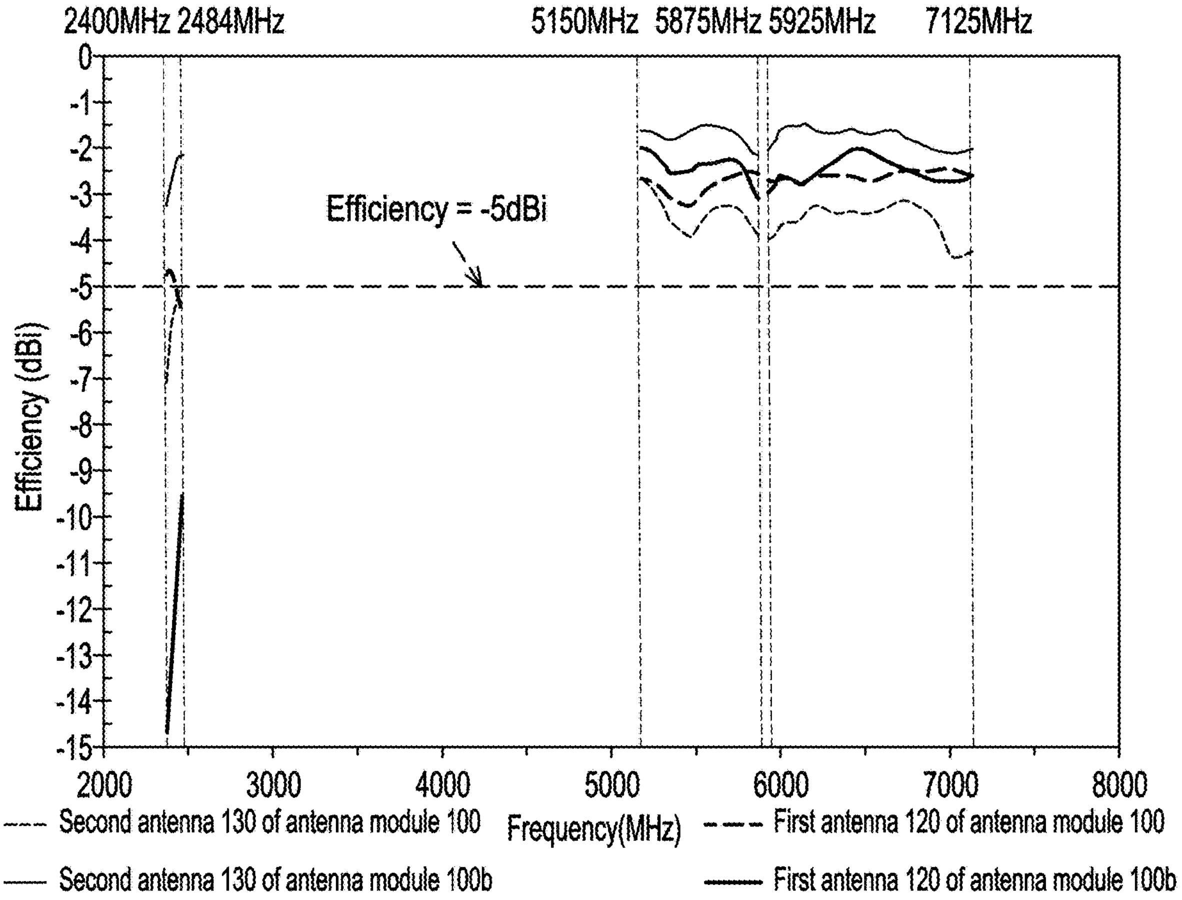
FIG. 8 is a frequency-efficiency relation view of the antenna module of FIG. 1 and the antenna module of FIG. 4.

FIG. 8 is a frequency-efficiency relation view of the antenna module of FIG. 1 and the antenna module of FIG. 4. It should be noted that when the second-order LC filter circuit is disposed in the antenna module 100*b*, the second antenna 130 of the antenna module 100*b* tends to be ineffective in the low frequency band. Referring to FIG. 8, in the embodiment, the efficiency of the antenna module 100*b* is respectively −2.2 to −3.2 dBi, −1.5 to −3.1 dBi, and −1.5 to −3.0 dBi at 2400 to 2484 MHz, 5150 to 5850 MHz, and 5925 to 7125 MHz, and has better efficiency performance than the antenna module 100.

Figure 9:
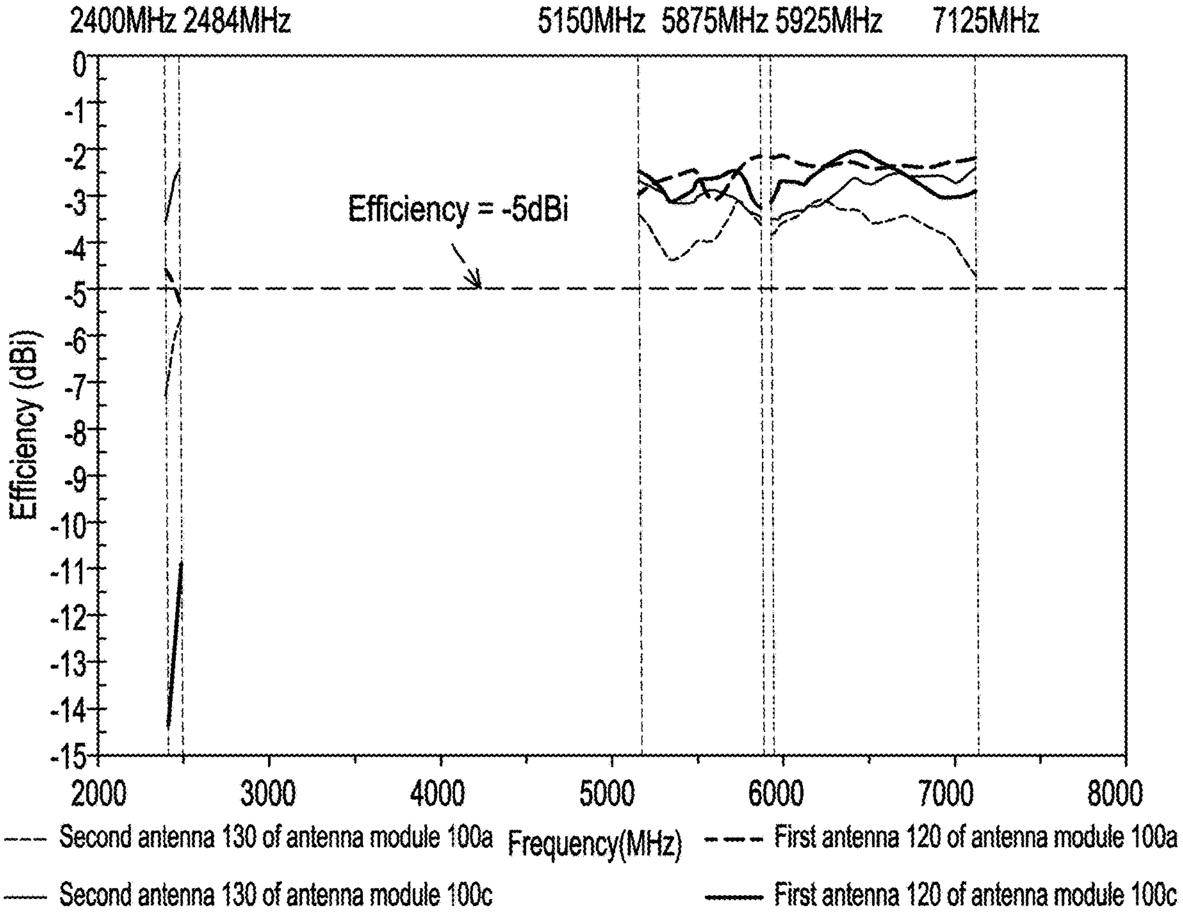
FIG. 9 is a frequency-efficiency relation view of the antenna module of FIG. 3 and the antenna module of FIG. 5.

FIG. 9 is a frequency-efficiency relation view of the antenna module of FIG. 3 and the antenna module of FIG. 5. It should be noted that when the second-order LC filter circuit is disposed in the antenna module 100*c*, the second antenna 130 of the antenna module 100*c* tends to be ineffective in the low frequency band. Referring to FIG. 9, in the embodiment, the efficiency of the antenna module 100*c* is respectively −2.3 to −3.5 dBi, −2.1 to −3.4 dBi, and −2.0 to −3.5 dBi at 2400 to 2484 MHz, 5150 to 5850 MHz, and 5925 to 7125 MHz, and has better efficiency performance than the antenna module 100*a*.

To sum up, the antenna module of the disclosure uses the second antenna to share the radiators of the first segment, the second segment, and the third segment of the first antenna, so that the antenna module has the characteristics of small size, broadband, and good performance. The first antenna controls the frequency point and impedance matching bandwidth of the first frequency band by adjusting the length and width of the second segment, and controls the frequency point and impedance matching bandwidth of the second frequency band by adjusting the length and width of the fourth segment and the first slot. On the other hand, the second antenna controls the frequency point and impedance matching bandwidth of the first frequency band by adjusting the length and width of the second slot, and controls the frequency point and impedance matching bandwidth of the second frequency band by adjusting the length and width of the sixth segment and the third slot. In addition, the antenna module also disposes the second-order LC filter circuit between the first antenna and the second antenna to improve the impedance matching of the second antenna in the first frequency band, and at the same time improve the isolation between the first antenna and the second antenna. Such a design can enable the antenna module to have the characteristics of simple structure, easy production, lower cost, and smaller size, and can be further applied to WiFi7 and 5G NR MIMO antennas.

What is claimed is:

1. An antenna module, comprising:

a ground radiator, comprising a first part and a second part connected to each other;

a first antenna, comprising a first feeding end, a first segment extending from the first feeding end, a second segment, a third segment, and a fourth segment, wherein the second segment, the third segment, and the fourth segment extend from the first segment, the third segment is connected to the ground radiator, a first area comprising the first feeding end, the first segment, and the second segment and a second area comprising the first feeding end, the first segment, the third segment, and the first part of the ground radiator resonate at a first frequency band, and a third area comprising the first feeding end, the first segment, and the fourth segment and the second area resonate at a second frequency band; and a second antenna, comprising a second feeding end, a fifth segment and a sixth segment, wherein the fifth segment and the sixth segment extend from the second feeding end, the fifth segment is connected to the third segment, a fourth area comprising the second feeding end, the fifth segment, the third segment, the first segment, and the second segment resonates at the first frequency band, and a fifth area comprising the second feeding end and the sixth segment and a sixth area comprising the second feeding end, the fifth segment, a part of the third segment, and the second part of the ground radiator resonate at the second frequency band.

2. The antenna module according to claim 1, wherein a distance between the first feeding end and the second feeding end is 0.25 times to 0.5 times a wavelength of the first frequency band.

3. The antenna module according to claim 1, wherein the fifth segment extends back and forth along a first axis to form a first winding path.

4. The antenna module according to claim 1, wherein a part of the fifth segment extends back and forth along a first axis to form a first winding path, and another part of the fifth segment extends back and forth along a second axis to form a second winding path.

5. The antenna module according to claim 1, wherein the first segment and the third segment are located next to the first part of the ground radiator, and a first slot is formed between the first segment and the first part and between the third segment and the first part.

6. The antenna module according to claim 1, wherein the fifth segment and the sixth segment are located next to the second segment, and a second slot is formed between the fifth segment and the second segment and between the sixth segment and the second segment.

7. The antenna module according to claim 1, wherein the fifth segment and the sixth segment are located next to the second part of the ground radiator, and a third slot is formed between the fifth segment and the second part and between the sixth segment and the second part.

8. The antenna module according to claim 1, further comprising a first conductive member and a second conductive member, wherein the first conductive member is connected to the first part of the ground radiator, the second conductive member is connected to the second part of the ground radiator, and a fourth slot is formed between the first conductive member and the second conductive member.

9. The antenna module according to claim 8, wherein the ground radiator further comprises a fifth slot, the fifth slot is concave and comprises a first gap and a second gap, the first gap and the second gap are bent and connected to form an L shape, the first gap is recessed in an edge of the second part of the ground radiator and located next to the fifth segment, and the second gap is located inside the first part of the ground radiator.

10. The antenna module according to claim 9, wherein the fifth segment and the third segment cooperate with a portion of the first part of the ground radiator located between the second gap and the third segment to form a first-order inductance, the fifth slot forms a first-order capacitance, a portion of the ground radiator located between the fourth slot and the fifth slot forms a second-order inductance, and the fourth slot forms a second-order capacitance.

* * * * *